UNITED STATES PATENT OFFICE.

HERMAN FRASCH, OF CLEVELAND, OHIO, ASSIGNOR TO THE SOLAR REFINING COMPANY, OF OHIO.

PROCESS OF REFINING PETROLEUM.

SPECIFICATION forming part of Letters Patent No. 542,849, dated July 16, 1895.

Application filed November 29, 1889. Serial No. 331,959. (No specimens.)

*To all whom it may concern:*

Be it known that I, HERMAN FRASCH, of the city of Cleveland, in the county of Cuyahoga and State of Ohio, have invented a new and useful Improvement in the Refining of Petroleum, of which the following is a full, clear, and exact description.

This invention relates to the treatment of petroleum of the Canadian or Lima class, either as crude petroleum or after distillation, for the purpose of getting rid of sulphur bodies therein.

In the treatment both of the crude oil and of the distillate of the oil the efficient agent is nitrous-acid fumes, which may be applied to the oil in the still, either directly in that form or by introducing into the still the ingredients from which it is produced; but in treating crude oil I prefer to produce the nitrous-acid gas from nitric acid within the oil contained in the still, and when treating the petroleum distillate I prefer to evolve the nitrous-acid gas outside of the vessel in which the distillate is to be treated.

In treating crude sulphur-bearing oil I use alkaline nitrate (Chili saltpeter I prefer) and mix it in a vessel with sulphuric acid, preferably that which has been already used in the treatment of petroleum, for the reason that it already contains a sufficient quantity of petroleum to convert the nitric acid into nitrous acid. Instead, however, of using sludge acid, fresh acid may be employed; but the use of the former is more economical and is really better. The vessel in which the niter and sulphuric acid are mixed should be of glass or other material capable of resisting the action of the sulphuric acid. The vessel containing this mixture of alkaline nitrate and sulphuric acid is placed in the still in which the oil is to be distilled, and the still is charged with crude petroleum. The still is then fired and the heat of the still causes the evolution from the mixture of niter and acid of nitrous-acid fumes, which mingle with and are absorbed by the oil before the distillation commences. A portion of the distillate which runs from the still will then be found to be deprived of offensive odor. The distillate thus produced is then placed in a still with lime—say, for example, for each hundred barrels of oil of forty-two gallons to the barrel two hundred pounds or more of dry calcium hydrate or lime slaked with water to a dry powder, which is kept in suspension by agitation and is re-distilled—and the product is then treated in the usual way with sulphuric acid after having removed the ammonia.

It may be found desirable to repeat the re-distillation over lime and subsequent sulphuric-acid treatment a second time, as a better burning oil is thereby produced.

The distillation over lime of the oil which has been subjected to the nitric-acid treatment is important, not only for the improvement of the product, but also because in this step of the process ammonia is formed, which is easily separated from the oil, and, being saved as a by-product, greatly reduces the expense.

The improvement in the distillate is due to the decomposition of nitrogen products from the prior treatment, which are broken up by the distillation with the aid of the lime. The ammonia is formed from such nitrogen products by the reduction of the same with some hydrocarbon or hydrocarbons in the presence of the alkaline substance, (lime,) the nitrogen of such products uniting with the hydrogen of the hydrocarbon or hydrocarbons. In order to recover the ammonia, the vapors and gases from the tail end of the condenser are passed through or over a liquid, which will absorb the ammonia—as, for example, dilute sulphuric acid or water or the like—or other means for separating ammonia from other gaseous fluids may be used. Some ammonia is, however, absorbed by the condensed oil. To recover this, it will suffice to wash the said oil with water or dilute acid in the agitator and separate the aqueous solution of the ammonia or ammonia-salt from the oil by settling and decantation or drawing off.

The apparatus used needs no particular description, as the still for distillation and the agitator for sulphuric-acid treatment are such as are ordinarily employed in the distillation of petroleum, and the vessel for mixing the saltpeter and sulphuric acid may be of any convenient shape and size, such as can be readily inserted into and removed from the still.

The exact quantity of saltpeter and sulphuric acid from prior sulphuric-acid treatments to be employed is not important, provided that there is a sufficient amount to evolve as much of the nitrous-acid gas as the oil will absorb; but the amount used for a still containing five thousand gallons of crude petroleum should be about one hundred and sixty pounds of saltpeter and one hundred and twenty pounds of sulphuric acid from the agitator.

It should also be observed that there is a special advantage in this process in that sulphuric acid is present to act as a liquid or as a vapor (formed by the heat of distillation) upon impurities in said oil or its vapors, and thus a purer distillate is obtained than would result from a distillation of petroleum which had been merely treated with nitrous-acid fumes.

In treating distillate obtained from the distillation by the usual methods of sulphur-bearing petroleum I proceed as follows: The petroleum distillate is placed in an agitator, which may be of usual construction. I prepare nitrous-acid gas by the reduction of nitric acid by starch in the manner well known. This nitrous-acid gas is then introduced into the bottom of the agitator and the distillate is agitated therein, the gas being readily absorbed. If preferred, nitrate of potash and sulphuric acid may be introduced into the agitator, instead of the nitrous-acid fumes; but the latter is the cleaner method. The distillate during this process of mixing with nitrous acid assumes a dark-green hue, which continues until the sulphur compounds of the oil become oxidized, when the color of the oil suddenly changes to a bright yellow. When this change takes place, the nitrous-acid treatment is discontinued. A portion of the sulphur contained in the oil before treatment will have been converted into sulphuric acid, and most of the residue of the sulphur forms an oxygen-sulphur compound with a large excess of nitrogen products. The sulphuric acid thus formed in the oil is then removed by washing with water and alkali. The oil, however, is still of too dark a color, owing to the presence of the nitrogen products. In order to remedy this defect and further improve the oil, I distill it with lime or other alkali present in the still, with or without first treating the distillate with sulphuric acid. This redistillation partially removes the nitrogen products, the nitrogen being separated from the oil by the action of alkali on the nitric and nitrite products contained therein, appears in the form of ammonia which is readily recovered and separated from the oil, and, as before stated, forms a by-product which makes a considerable saving in the expense of the process.

What I claim as my invention, and desire to secure by Letters Patent, is—

1. The process of purifying petroleum of the Canadian or Lima class from sulphur compounds consisting in subjecting such sulphur-bearing petroleum to the action of nitrous acid fumes at the temperature and during the process of distillation; substantially as described.

2. The process of purifying petroleum of the Canadian or Lima class from sulphur compounds consisting in placing a mixture of alkaline nitrate and sludge acid in a still with such sulphur-bearing petroleum, and then (by heating the still) producing nitrous acid fumes and distilling over the petroleum, the oil in the sludge acid being utilized to reduce the nitrous acid fumes and the decomposition of oil in distillation for this purpose being avoided or lessened, and the oil being subjected to the nitrous acid fumes at the temperature and during the process of the distillation thereof; substantially as described.

3. The process of purifying sulphur-bearing petroleum of the Canadian or Lima class, previous to the final treatment by distillation and washing with sulphuric acid, consisting in subjecting such sulphur-bearing petroleum to nitrous acid fumes until the sulphur compounds have been sufficiently acted upon, as indicated by the change of the original green color to yellow; substantially as described.

4. The process of purifying sulphur-bearing petroleum of the Canadian or Lima class, by treatment with nitrous acid fumes, in conjunction with a distillation after an action of said fumes upon such oil or the sulphur-containing impurities therein, said treatment being effected under conditions of elevated temperature (such as that of the distillation itself) or of prolonged exposure (such as effects a change of the original green color to yellow), whereby the sulphur compounds are sufficiently acted upon, and a decomposition of resulting nitrogen products being effected by the distillation; substantially as described.

5. The improvement in purifying sulphur-bearing petroleum of the Canadian or Lima class, consisting in subjecting such petroleum to nitrous acid fumes, and effecting a decomposition of resulting nitrogen products with formation of ammonia by a distillation of the treated oil in the presence of lime; substantially as described.

6. The improvement in purifying sulphur-bearing petroleum of the Canadian or Lima class, consisting in subjecting such petroleum to nitrous acid fumes, distilling in the presence of lime the oil which has been thus treated, and recovering the ammonia from the distillation products; substantially as described.

7. The improvement in purifying sulphur-bearing petroleum of the Canadian or Lima class, consisting in subjecting such petroleum to the action of nitrous acid fumes, and distilling the so-treated oil in presence of a reagent which aids the distillation to effect a decomposition of nitrogen products; substantially as described.

8. The improvement in purifying sulphur-bearing petroleum of the Canadian or Lima class, consisting in subjecting such petroleum to the action of nitrous acid fumes, and without neutralization distilling the so-treated oil; substantially as described.

9. The process of purifying sulphur-bearing petroleum of the Canadian or Lima class, consisting in subjecting such petroleum, in conjunction with distillation, to the action of nitrous acid fumes and of sulphuric acid; substantially as described.

10. The improvement in purifying sulphur-bearing petroleum of the Canadian or Lima class, by distilling such petroleum, subjecting it to the action of nitrous acid fumes at the temperature and during the process of the distillation, and effecting a decomposition of nitrogen products in the resulting distillate with formation of ammonia therefrom by distilling said distillate in the presence of lime; substantially as described.

In testimony whereof I have hereunto set my hand this 27th day of September, A. D. 1889.

HERMAN FRASCH.

Witnesses:
T. W. LOTHMAN,
F. B. SQUIRE.